United States Patent
Stubler et al.

(10) Patent No.: US 8,555,599 B2
(45) Date of Patent: Oct. 15, 2013

(54) METHOD FOR THE CONSTRUCTION OF A CIVIL ENGINEERING STRUCTURE AND ASSOCIATED SYSTEM

(75) Inventors: Jerome Stubler, Paris (FR); Jean-Daniel Lebon, Saint Germain en Laye (FR); Sebastien Petit, Paris (FR)

(73) Assignee: Freyssinet, Velizy Villacoublay (FR)

( * ) Notice: Subject to any disclaimer, the term of this patent is extended or adjusted under 35 U.S.C. 154(b) by 380 days.

(21) Appl. No.: 12/289,987

(22) Filed: Nov. 7, 2008

(65) Prior Publication Data

US 2009/0188204 A1 Jul. 30, 2009

(30) Foreign Application Priority Data

Nov. 9, 2007 (FR) ..................... 07 07880

(51) Int. Cl.
| | |
|---|---|
| *E04H 12/34* | (2006.01) |
| *E04B 1/00* | (2006.01) |
| *E04G 21/00* | (2006.01) |
| *E02D 7/00* | (2006.01) |
| *B21K 23/00* | (2006.01) |

(52) U.S. Cl.
USPC ..... 52/745.17; 52/123.1; 405/232; 29/897.33

(58) Field of Classification Search
USPC ............. 52/40, 123.1, 125.2, 745.17, 745.18, 52/120, 745.2; 405/231, 195.1, 232, 244, 405/203, 204; 29/897.33
See application file for complete search history.

(56) References Cited

U.S. PATENT DOCUMENTS

| | | | | |
|---|---|---|---|---|
| 3,828,513 A | * | 8/1974 | Vanderklaauw | 52/745.04 |
| 5,524,408 A | * | 6/1996 | Richey | 52/514.5 |
| 6,868,646 B1 | * | 3/2005 | Perina | 52/745.17 |
| 7,360,340 B2 | * | 4/2008 | Grundman et al. | 52/40 |
| 7,814,725 B2 | * | 10/2010 | Kwon | 52/745.17 |
| 8,070,000 B2 | * | 12/2011 | Botwright et al. | 212/228 |
| 2004/0098941 A1 | * | 5/2004 | Cornell et al. | 52/651.01 |
| 2007/0266538 A1 | * | 11/2007 | Bervang | 29/428 |
| 2009/0188204 A1 | * | 7/2009 | Stubler et al. | 52/745.18 |
| 2010/0257797 A1 | * | 10/2010 | Gomez et al. | 52/294 |
| 2013/0008097 A1 | * | 1/2013 | Margevicius et al. | 52/123.1 |

FOREIGN PATENT DOCUMENTS

| | | | |
|---|---|---|---|
| DE | EP0607915 A1 | * | 1/1994 |
| EP | 0607915 A1 | | 1/1994 |
| EP | 1350953 A2 | | 10/2003 |
| FR | 2167435 | * | 1/1972 |

OTHER PUBLICATIONS

Translation of EP0607915A1; Dec. 14, 2010.*

* cited by examiner

*Primary Examiner* — Ryan Kwiecinski
(74) *Attorney, Agent, or Firm* — McKenna, Long & Aldridge, LLP

(57) ABSTRACT

A method of construction of a civil engineering structure that includes first and second superimposed components is described. According to one embodiment of the method: the second component is positioned beneath a fixed lifting structure that includes a lifting device, the second component is lifted using the lifting device, the first component is positioned beneath the fixed lifting structure substantially below the second component, and the second component is substantially placed on the first component using the lifting device, while the second component remains substantially in place.

25 Claims, 9 Drawing Sheets

METHOD FOR THE CONSTRUCTION OF A CIVIL ENGINEERING STRUCTURE AND ASSOCIATED SYSTEM

This application claims priority to French Patent Application No. 07 07880 filed on Nov. 9, 2007, which is hereby incorporated by reference in its entirety.

BACKGROUND OF THE INVENTION

This invention relates to the construction of a civil engineering structure comprising superimposed components.

Civil engineering structures are generally of large size and require specific means of construction which are very often only used on a one-off basis.

By way of example, the construction of an offshore wind generator, that is to say one which is intended to be located in the open sea, conventionally takes place as follows: the bottom part of the wind generator including the base is built on shore, it is transported to sea holding it by a crane placed on a barge, and then once at sea the hub and the blades forming the rotor of the wind generator are fitted to the bottom portion of the wind generator.

It will be understood that such work is relatively long, complex and costly.

In the special case of an offshore wind generator the complexity of the work is increased by the fact that it is largely carried out in the open sea. Even work carried out alongside a quay can given rise to problems, in that quays of sufficient size which are capable of bearing large loads, which are particularly rare and expensive, are required.

In the face of these difficulties, one object of this invention is to provide a method for the construction of a civil engineering structure which is simpler and less costly.

SUMMARY OF THE INVENTION

The invention thus provides a method for the construction of a civil engineering structure comprising first and second superimposed components. The method comprises the following steps:
  positioning of the second component on a fixed lifting structure comprising lifting means,
  lifting the second component using the lifting means,
  positioning the first component beneath the fixed lifting structure substantially below the second component, and
  placing the second component substantially on the first component using the lifting means.

If the civil engineering structure comprises at least n superimposed components, where n>2, the method may advantageously also comprise the following steps, repeated for p from 2 to n−1, when the first components p of the civil engineering structure have already been placed upon each other:
  moving the superimposed p first components away from the fixed lifting structure using movement means,
  positioning the p+1$^{th}$ component beneath the fixed lifting structure,
  lifting the p+1$^{th}$ component using the lifting means,
  positioning superimposed p first components beneath the fixed lifting structure substantially below the p+1$^{th}$ component, and
  placing the p+1$^{th}$ component substantially superimposed upon the p first components using the lifting means.

The use of such a fixed lifting structure in which the various components of the civil engineering structure being constructed are delivered in order to be superimposed renders the method of construction particularly simple and effective.

According to advantageous embodiments which may be combined in any foreseeable manner:
  the positioning of a component beneath the fixed lifting structure is carried out using movement means,
  the movement means comprise a jacking and horizontal movement device comprising jacks on an air cushion,
  the fixed lifting structure is in the form of a portal,
  the fixed lifting structure is located on or close to a construction surface on which the civil engineering structure is essentially or entirely constructed,
  the fixed lifting structure is anchored on or close to the construction surface,
  the fixed lifting structure is anchored using stays,
  the construction surface is organized into working areas each having a specialized task,
  the specialized tasks comprise at least one task among the following: the production of components, mechanical assembly and the performance of functional tests on the civil engineering structure before it is transported to its permanent installation site,
  the surface of the working area having the specialized task of performing tests is arranged so as to correctly distribute forces beneath the civil engineering structure,
  each specialized task is divided into sub-tasks, each sub-task always being carried out at the same station and sub-components of the civil engineering structure being moved from station to station,
  the fixed lifting structure is also used in the context of at least one of the said specialized tasks,
  movement means make it possible to move a component or a sub-component of the civil engineering structure between at least one of the working areas and the fixed lifting structure,
  the movement means comprises a jacking and horizontal movement device comprising jacks on an air cushion,
  the civil engineering structure is intended to be installed in an aquatic medium and the construction surface is close to an aquatic communications route,
  the civil engineering structure is of a height greater than the dimensions of its base,
  the civil engineering structure is a wind generator comprising a bottom portion including a base and superimposed on the said bottom portion a nacelle incorporating a hub and designed to bear the blades of a rotor,
  the nacelle is positioned beneath the fixed lifting structure, the nacelle is raised using the lifting means, the bottom portion is positioned beneath the fixed lifting structure and substantially below the nacelle, and the nacelle is placed substantially on the bottom portion using the lifting means,
  when it is being lifted and substantially placed on the bottom portion, the nacelle is provided with only part of the rotor blades, the additional part of the rotor blades being attached to the nacelle when the nacelle has been substantially placed on the bottom portion,
  the rotor comprises three blades and the nacelle is provided with only two blades when it is lifted and substantially placed on the bottom portion,
  the nacelle and the two blades are lifted and placed substantially on the bottom portion in a position such that the third blade attached to the nacelle is located in a vertical axis beneath the nacelle,
  the fixed lifting structure is also used to place at least part of the rotor blades on the nacelle, provision is also made for moving the wind generator away from the fixed lifting structure in which lateral movement of the wind generator is accompanied by rotational movement of the rotor making it possible to avoid contact between the blades and the fixed lifting structure, the civil engineering structure is a gravity structure offshore wind generator, and/or the civil engineering structure is a bridge pier.

The invention also provides a system designed to construct the civil engineering structure comprising at least a first and a second component superimposed according to the above-mentioned method. This system comprises a fixed portal comprising lifting means capable of lifting the first component when the first component has been positioned beneath the fixed portal and of placing the first component substantially on the second component when the second component has been positioned beneath the fixed portal substantially below the first component.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

The construction of a civil engineering structure according to the invention makes use of a fixed lifting structure 1 comprising lifting means 2. As will be more particularly envisaged in the description which follows by way of a non-restrictive example, this structure may advantageously take the form of a portal. Such a fixed portal 1 is for example in the shape of an upside-down U, with two vertical uprights 5b topped by a horizontal portion 5a. Portal 1 is said to be fixed insofar as it does not move in relation to the support on which it stands.

Lifting means 2 may be of any type (crane hook, etc.). It is arranged so as to lift any component or sub-component of the civil engineering structure under construction when positioned beneath the fixed portal. It is also arranged so that any component or sub-component of the civil engineering structure under construction which has been previously lifted can be caused to descend. The actions of lifting or lowering the lifting means are for example carried out in response to control which may be mechanical and/or electrical.

Lifting and lowering may for example be carried out mainly in a vertical axis such that the median axis cuts the top horizontal bar 5a of fixed portal 1. In addition to these vertical movements, other movements of lifting means 2 may be provided, such as for example rotation about a vertical axis or lateral movement along a horizontal axis for example.

Fixed portal 1 and its lifting means 2 are of course dimensioned according to the characteristics of the components of the civil engineering structure which they must help to build.

With reference to FIGS. 1a-1e, to construct a civil engineering structure comprising the superposition of a first lower component E1 and a second upper component E2, a procedure is as follows.

Figure 1A:
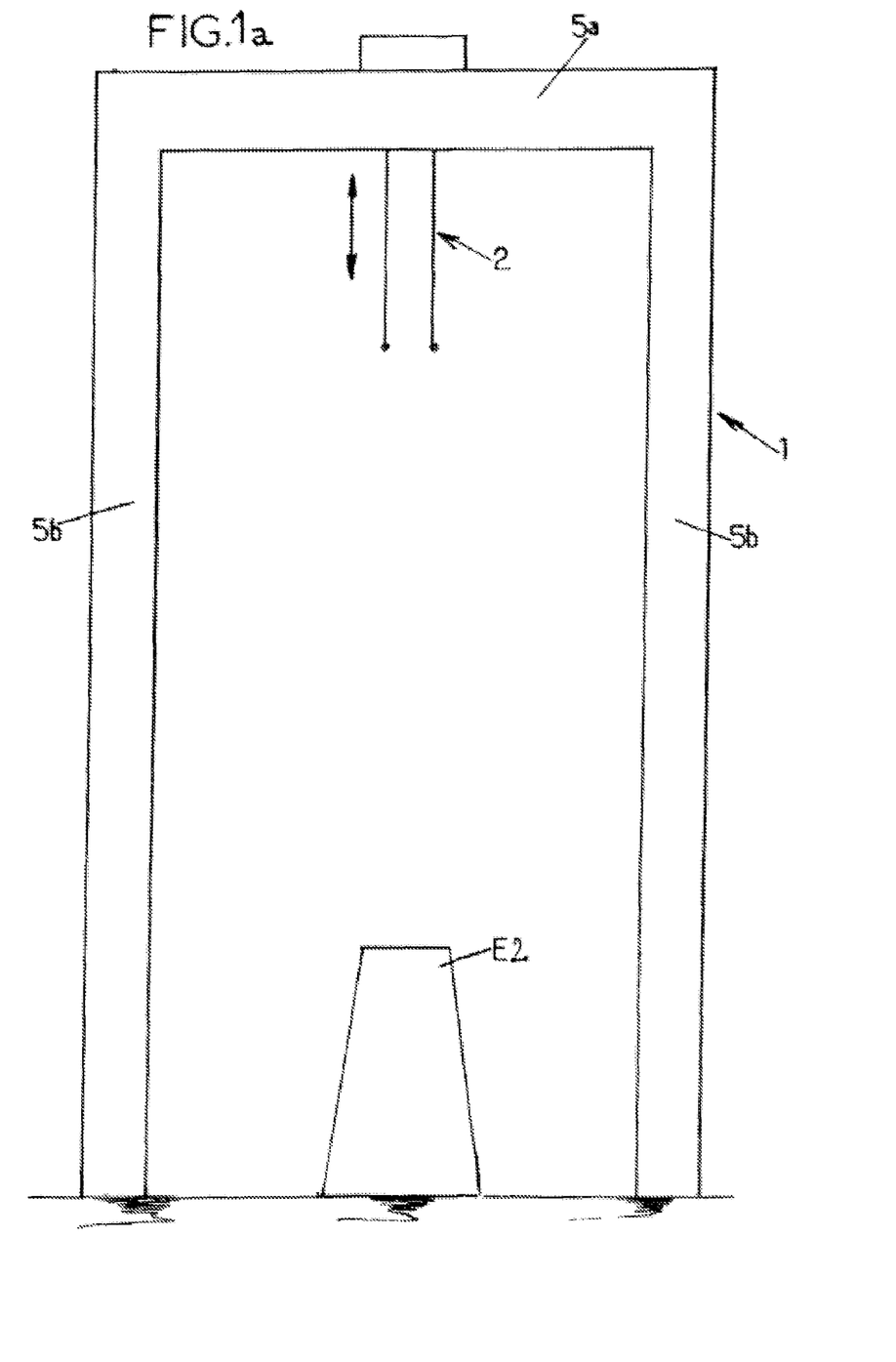
FIG. 1a a diagram illustrating a positioning of a second component beneath a fixed lifting structure comprising a lifting means, according to the invention.
Figure 5:
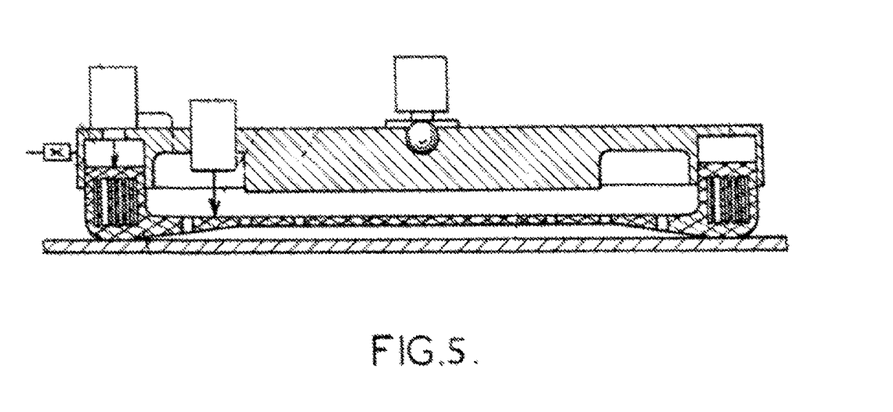
FIG. 5 is a diagram illustrating a non-limiting example of a movement means comprising a jacking and horizontal movement device comprising jacks on an air cushion, according to the invention.

Second component E2 is first of all positioned beneath fixed portal 1. For this purpose second component E2 is moved by any means (e.g. as exemplified in the non-limiting illustration of FIG. 5, using the jacking and horizontal movement device comprising jacks on an air cushion, a trolley on wheels, a trolley on rails, or other means) immediately below fixed portal 1, while the latter remains in place.

Figure 1B:
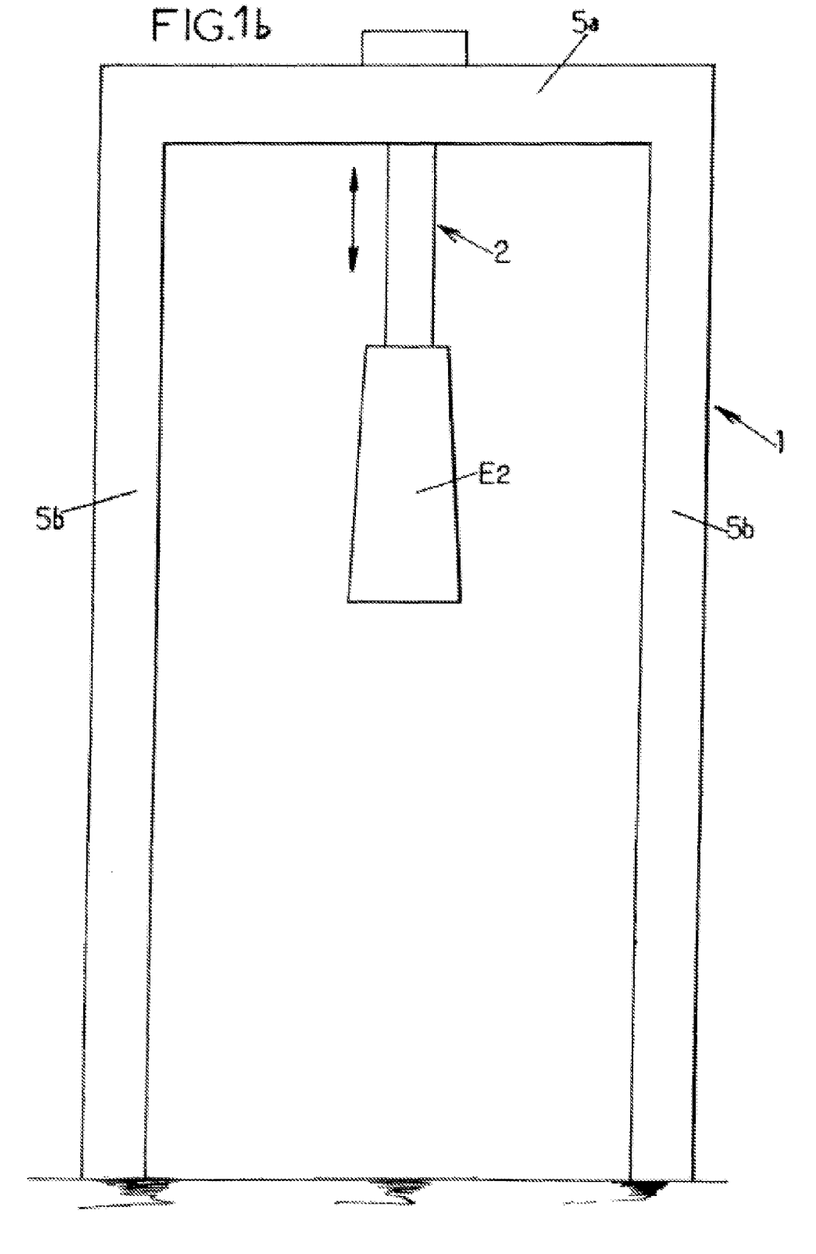
FIG. 1b is a diagram illustrating a lifting of the second component using the lifting means, according to the invention.
Figure 1C:
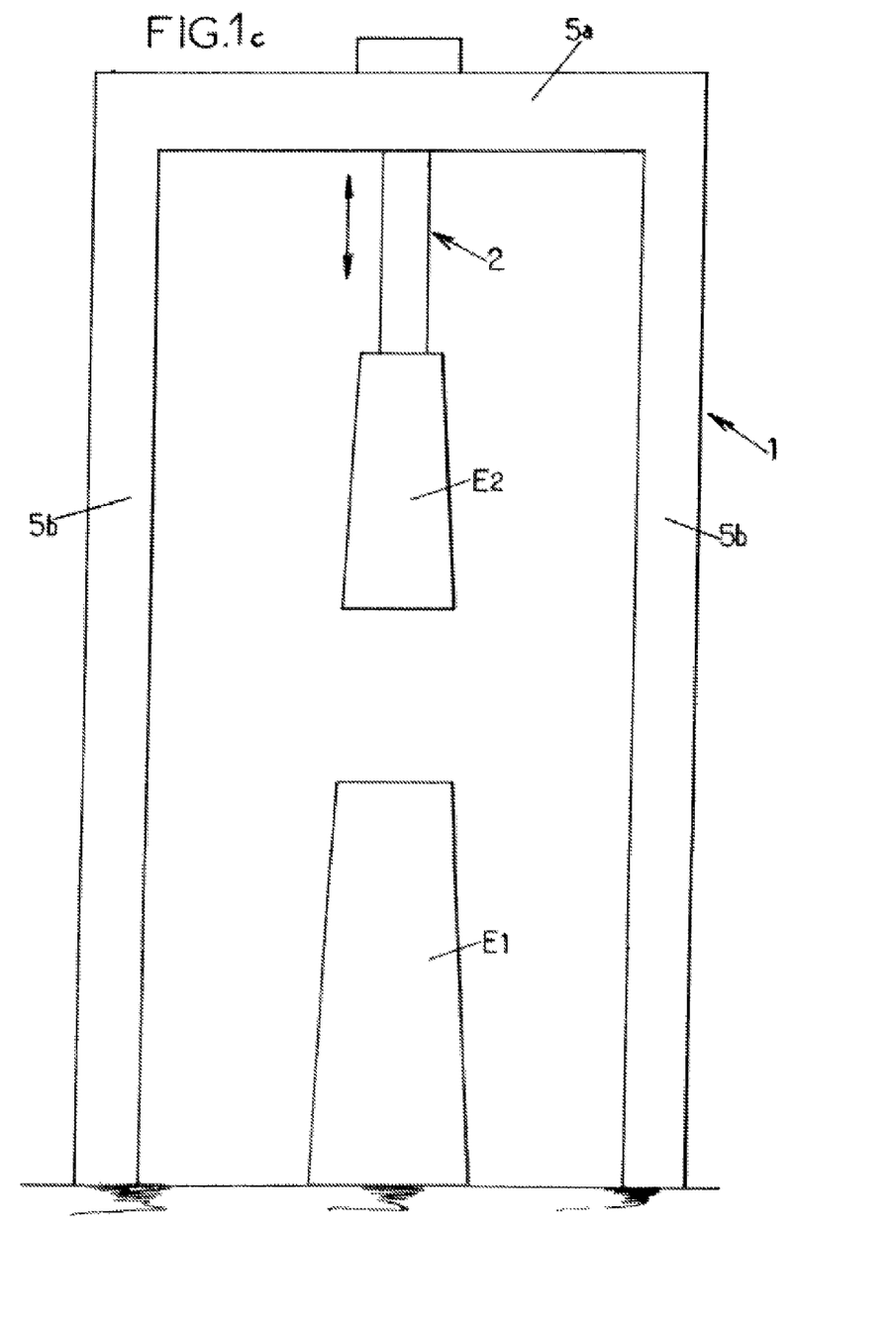
FIG. 1c is a diagram illustrating a positioning of the first component beneath the fixed lifting structure substantially below the second component, while the second component remains substantially in place according to the invention.

Second component E2 is then lifted by means of lifting means 2. First component E1 is then positioned beneath fixed portal 1 substantially below second component E2.

Figure 1D:
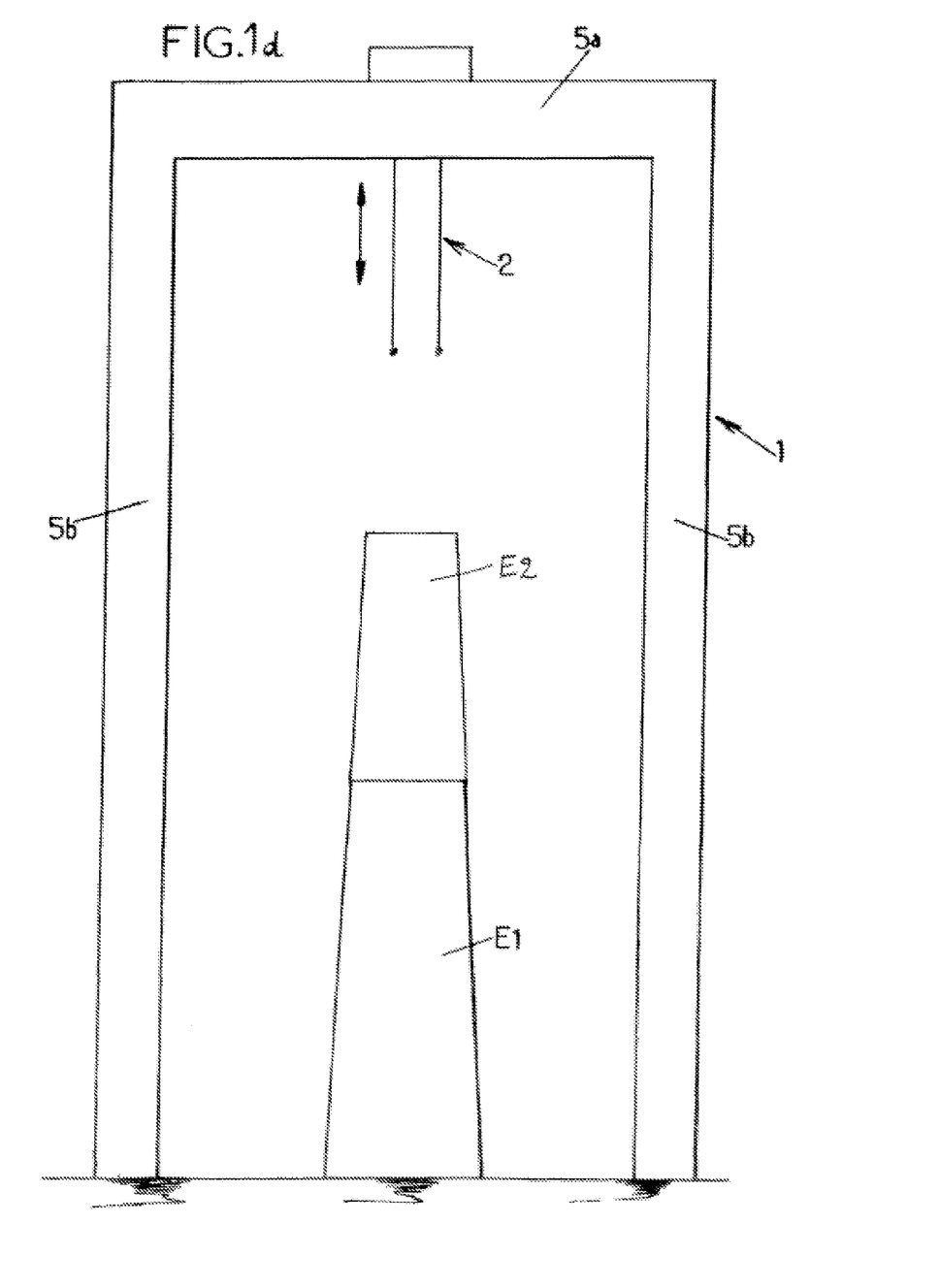
FIG. 1d is a diagram illustrating the second component substantially on the first component, subsequent to the placement of the second component substantially on the first component buy use of the lifting means, according to the invention.

Second component E2 is then lowered to be placed substantially on first component E1 using lifting means 2.

Components E1 and E2 may be attached to each other, for example by bolting, welding or other means. For this purpose one or more fixed or mobile working cradles may be attached to fixed portal 1 to allow operators to gain access to the area of attachment between components E1 and E2.

Once components E1 and E2 have been assembled, they may be moved away from fixed portal 1, for example by lateral movement. This movement may be carried out in a manner similar to the manner in which components E1 and E2 have been brought beneath fixed portal 1, for example using movement means (e.g. a jacking and horizontal movement device comprising jacks on an air cushion, a trolley on wheels, a trolley on rails, or other means).

Figure 1E:
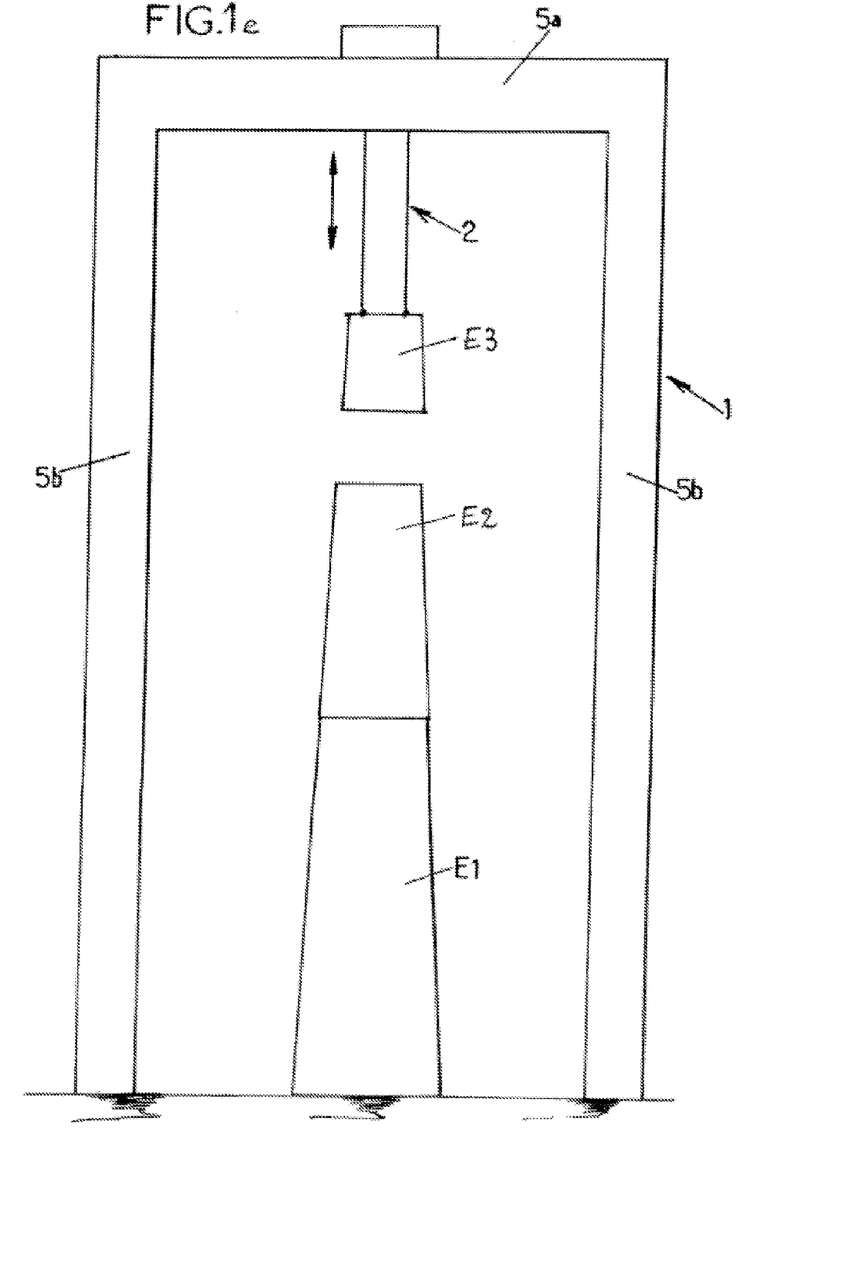
FIG. 1e is a diagram illustrating a positioning of the first and second components beneath the fixed lifting structure substantially below a third component, while the third component remains substantially in place, according to the invention.

If appropriate these steps may be repeated as many times as are necessary to stack all the components constituting the civil engineering structure. Thus the new component formed through the superimposition of components E1 and E2 may then be lifted to be placed on a component E3 in the same manner as described previously.

Alternatively, a component E3 may be lifted in order to be placed on superimposed components E1 and E2, as described previously. This latter embodiment is particularly useful, since in this case the maximum load lifted by the lifting means does not exceed the mass of the heaviest component Ei which makes the portal more economical.

Figure 2:
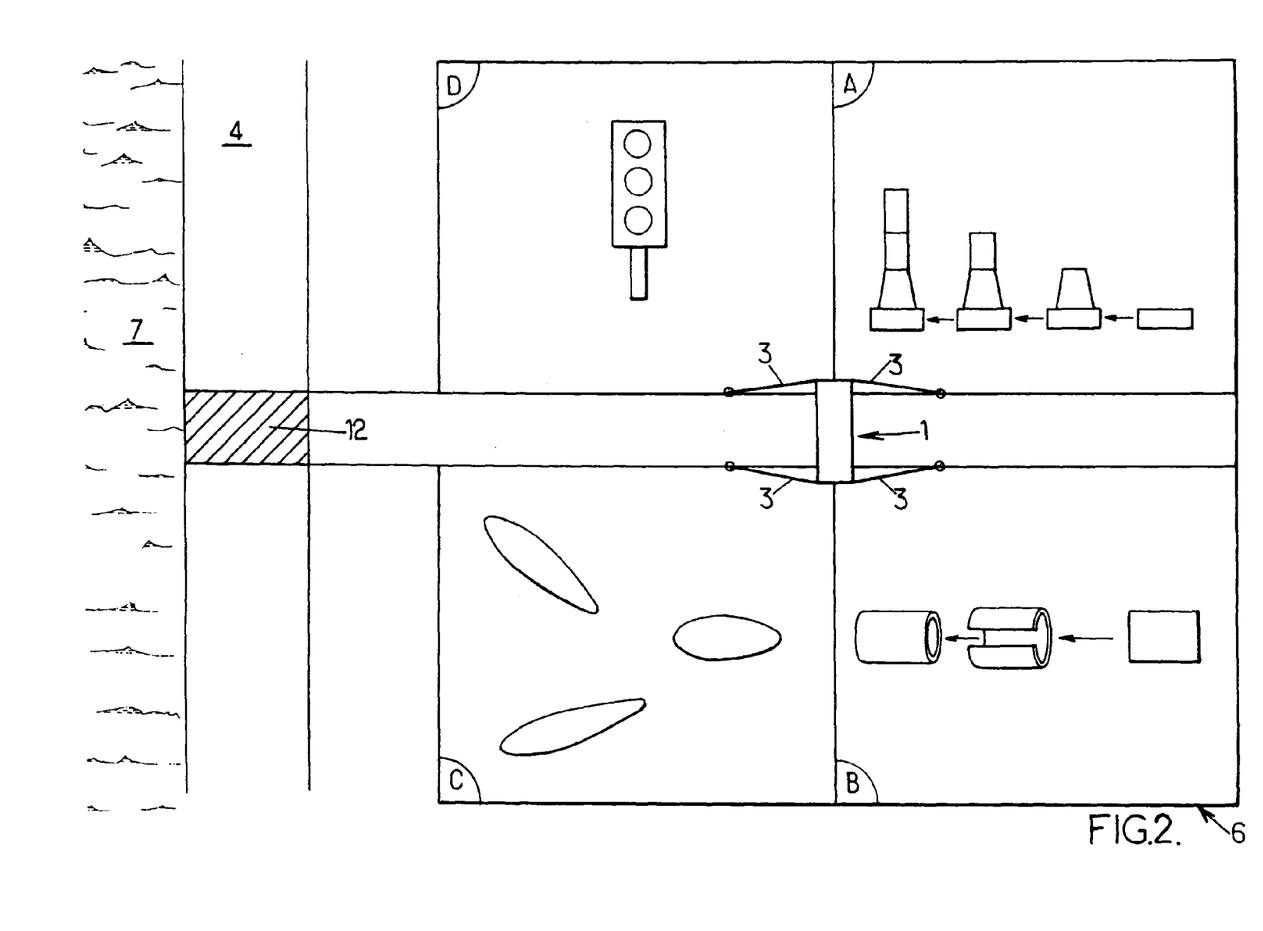
FIG. 2 is a diagram illustrating an embodiment of the invention involving a construction surface.

According to an advantageous embodiment of which an example is illustrated in a view from above in FIG. 2, fixed portal 1 is located on a construction surface 6 on which the civil engineering structure is essentially or completely constructed. As a variant, fixed portal 1 may be located close to construction surface 6. It may possibly be anchored on or close to that construction surface 6, for example by means of stays 3 or any other appropriate anchorage means.

In the example illustrated, fixed portal 1 is located substantially at the centre of construction surface 6, although other positions are possible.

Construction surface 6 is advantageously o organized into working areas, each of which have a specialized task.

In the example illustrated in FIG. 2, these areas A-D are four in number and carry out the following specialized tasks respectively: the production of concrete components, the production of metal components, mechanical assembly and the performance of functional tests on the civil engineering structure before it is transported to its permanent installation site.

In the non-restricting case where the civil engineering structure under construction is a wind generator comprising a bottom portion including a concrete base and possibly a metal drum, together with a nacelle incorporating a hub and intended to bear the blades of a rotor, areas A-D may also permit the following tasks to be carried out respectively: fabrication and assembly of the concrete base, fabrication and assembly of the metal drum, mechanical assembly of the nacelle, including in particular the fitting of at least some of the blades to the rotor and possibly the fitting of other mechanical components (rotor bearing, rotor pitch control system, reduction gear, alternator, rotor regulator, etc.), and the performance of tests on the wind generator to ensure that it is in proper working order.

The production of concrete components and/or the production of metal components may for example be organized into manufacturing production lines through which the sub-components of the structure under construction progress. For this purpose each specialized task may be divided into sub-tasks, each sub-task always being carried out at the same station and the sub-components being moved from station to station.

The sub-components may be moved horizontally within the production lines using any movement system such as a jacking device and horizontal movement comprising jacks on a cushion of air, a trolley on wheels, a trolley on rails, etc.

Where present, the testing area may comprise a connection to an electrical load. Where appropriate this will make it possible to minimise the costs of testing at sea. Within this area the wind generator is advantageously temporarily placed on a surface which correctly distributes the forces on its base.

Of course only some of the abovementioned specialist tasks may be put into practice. Other specialist tasks may also be envisaged. Likewise the number of areas on the construction surface may also vary according to need.

Advantageously, fixed portal 1 may also be used in the context of one or more of the said specialist tasks.

By way of example, lifting means 2 of fixed portal 1 may be used to lift a rotor blade in order to attach it to the rotor incorporated in the nacelle, or to allow sub-assemblies of the concrete base or metal drum to be superimposed. For this purpose a component or sub-component of the civil engineering structure under construction may be moved by any movement means (e.g. using a jacking and horizontal movement device comprising jacks on a cushion of air, a trolley on wheels, a trolley on rails, or other means) between the working area in question and fixed portal 1. This movement may comprise positioning of that component or sub-component beneath fixed portal 1 and/or return of that component or sub-component from fixed portal 1 towards the appropriate working area on the construction surface. The movement means used may possibly be the same as a movement system used in the production line in the said working area.

With such an embodiment the civil engineering structure can be essentially or entirely constructed on or close to a dedicated space, namely construction surface 6. It thus provides a finished structure which is partly or wholly validated by tests, and therefore ready for use. This therefore is a rationalization of the construction method, which permits the repetitive construction of a series of civil engineering structures, contrary to current practice.

When the civil engineering structure under construction is intended to be stored in an aquatic medium, for example at sea, it is found that construction in accordance with this procedure is very much simpler than in the prior art, in particular because it is mainly or wholly carried out on land.

In the case in point, the construction surface may advantageously be located close to the sea or a maritime or fluvial communications route, in order to limit the operations required to place the finished structure in an aquatic medium.

Thus, in the example illustrated in FIG. 2, construction surface 6 is connected to a quay 4 adjacent to an aquatic communications route 7. Construction surface 6 comprises a separate area which may be at a distance from the quay, which avoids the necessity to carry out heavy construction steps on quay 4 and therefore to have to hire or build a sufficiently large and robust quay for the purpose, which would be very expensive. The portion of quay 12 used is limited to what is strictly necessary for floating of the completed civil engineering structure.

The invention may be applied to the construction of any type of civil engineering structure. According to a non-restrictive example the civil engineering structure may have a height which is greater than the dimensions of its base. Mention may be made for example of a wind generator, a bridge pier, or any other structure which is substantially in the form of a pylon or tower.

The case of a wind generator is considered more particularly below. This may be an offshore gravity structure wind generator designed to be located at sea, or onshore, that is to say intended to be located on land.

Figure 3:
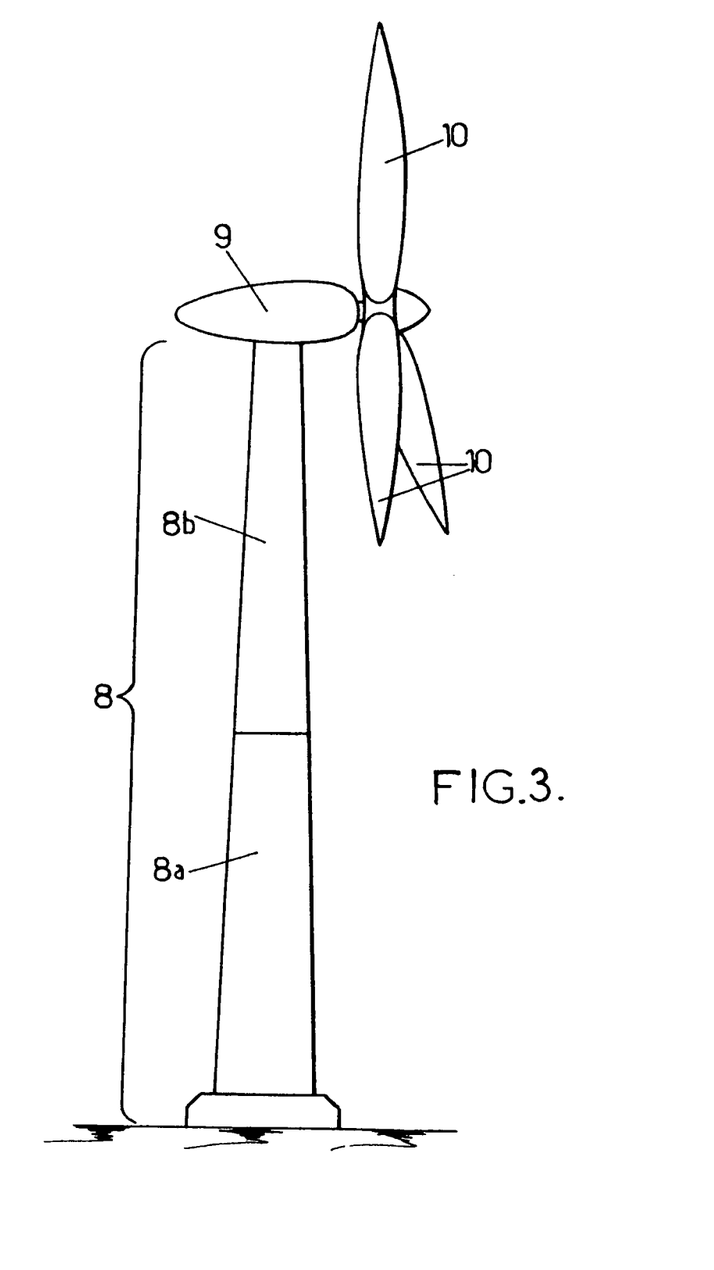
FIG. 3 is a diagram illustrating a wind generator.

In the example illustrated in FIG. 3, such a wind generator comprises a bottom portion 8, which may be monolithic or may comprise several superimposed components such as a concrete base 8a and a metal drum 8b, together with a nacelle 9 incorporating a hub and intended to carry the blades 10 of a rotor. By way of illustration, in the case of a wind generator which is capable of producing 6 MW, base 8 may be of up to some fifty to one hundred meters, while nacelle 9 may have a weight of the order of 300 metric tons.

With reference to the notation used in FIG. 1, when the manner of construction according to the invention is applied to such a wind generator, nacelle 9 may be regarded as a second component E2 and bottom portion 8 as a first component E1.

Thus construction of the wind generator in FIG. 3 comprises the following steps: nacelle 9 is positioned beneath the fixed portal, nacelle 9 is lifted using the lifting means of the fixed portal, bottom portion 8 is positioned beneath the fixed portal substantially below nacelle 9, and nacelle 9 is placed substantially on bottom portion 8 using lifting means. These steps make it possible to achieve the superimposition in FIG. 3, that is to say that nacelle 9 then rests on bottom portion 8.

When it is lifted and placed on base 8, the nacelle may be fitted with none of blades 10 which will form the rotor of the wind generator, or with all these blades 10. Alternatively only some of blades 10 of the rotor may be fixed to nacelle 9 during the steps, the supplementary portion of blades 10 of the rotor being attached to nacelle 9 when the latter has been placed on bottom portion 8.

In addition to superimposition of bottom portion 8 and nacelle 9, other steps in construction of the wind generator may be carried out using the fixed portal. By way of example, the fixed portal may be used to place at least some of blades 10 of the rotor on nacelle 9. Advantage is thus taken of the lifting capacity of the fixed portal at various stages in construction.

FIGS. 4A-4G illustrate successive steps according to one example of the construction of a wind generator, in side view.

Figure 4A:
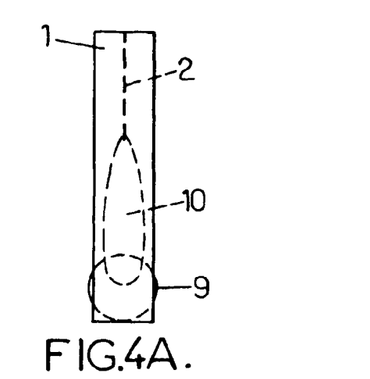
FIGS. 4A-4G are diagrams illustrating one example of successive steps in the construction of a wind generator.

In FIG. 4A, nacelle 9 is positioned beneath fixed portal 1 and a first blade 10 is lifted using lifting means 2 of fixed portal 1 in order to be attached to the rotor incorporated in nacelle 9.

Figure 4B:
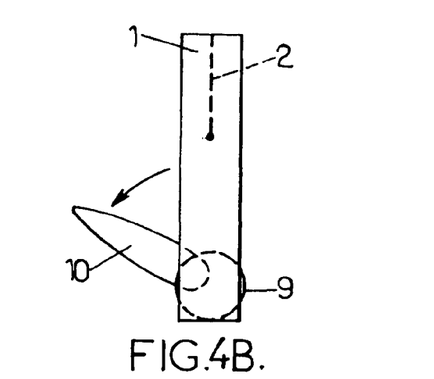
Figure 4C:
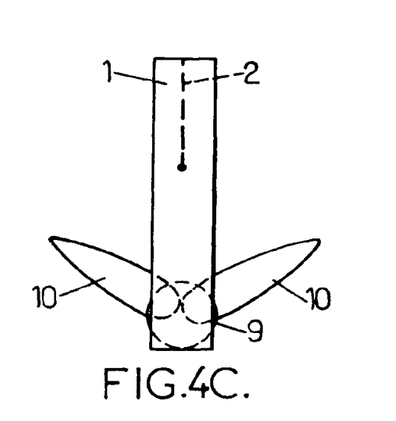

The rotor is then turned to move first installed blade 10 to a desired position as illustrated in FIG. 4B.

A second blade 10 is then attached to the rotor. It takes up a desired position which may advantageously be symmetrical with first blade 10 in relation to a vertical axis passing through the centre of nacelle 9 (see FIG. 4C).

Figure 4D:
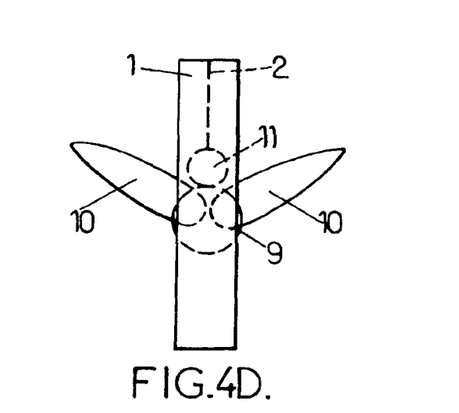

The assembly comprising nacelle 9 and the two fitted blades 10 is lifted using lifting means 2 of fixed portal 1. For this purpose, as illustrated in FIG. 4D, a metal frame 11 may be attached to that assembly and temporarily attached to lifting means 2. Its position is preferably selected according to the centre of gravity of the assembly in order to ensure balanced lifting. The lifting point is advantageously located above the centre of gravity of the assembly.

The assembly comprising nacelle 9 and two blades 10 is then placed on bottom portion 8, as explained above (see FIG. 4E).

Figure 4E:
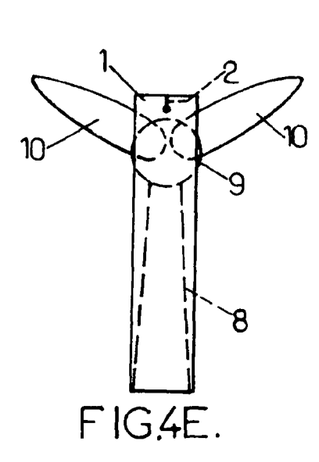

When they are lifted and placed on bottom portion 8, nacelle 9 and the two blades 10 are for example in a position such that the third blade joined to the nacelle can be placed in a vertical axis beneath the nacelle.

Figures 4F, 4G:
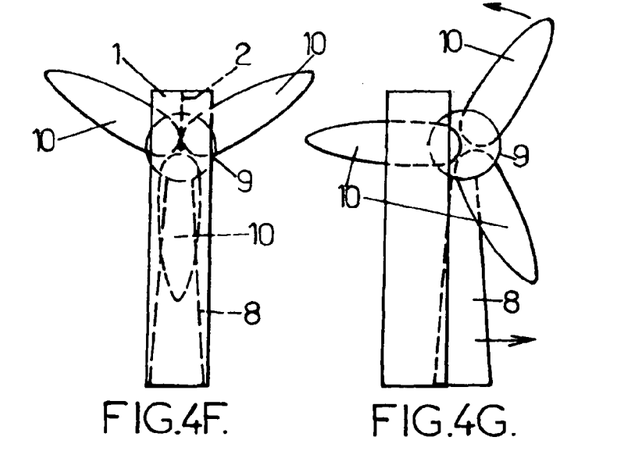

Finally the third blade 10 is lifted, for example using lifting means 2 of fixed portal 1, and then attached to the hub incorporated in nacelle 9 so as to form the rotor of the wind generator.

If one of blades 10 extends close to the upper horizontal bar 5a of the portal, provision may also be made to turn the rotor when finished wind generator 1 leaves the portal in lateral movement in order that it should avoid bar 5a (see FIG. 4G).

Through this non-restrictive example it will be understood that fixed portal 1 may be involved in various stages in construction.

Of course steps other than those mentioned above may make use of fixed portal 1 and its lifting means 2. By way of example, when bottom portion 8 of the wind generator comprises a concrete base 8a and a metal drum 8b as illustrated in FIG. 3, these two parts may be superimposed using a fixed portal 1 in accordance with the principles described above. Nacelle 9 is then placed substantially on superimposed base 8a and drum 8b.

As will be apparent to those skilled in the art, this invention renders the construction of civil engineering structures very much easier than in the prior art. It in fact makes it possible to industrialize a civil engineering process and limit the complexity and capacity of the lifting means required. In this respect it may be particularly useful for the repetitive construction of a plurality of identical or similar structures, as is the case for example with a series of wind generators or the various piers of a bridge.

The invention claimed is:

1. A method for the construction of a civil engineering structure comprising n superimposed components, where n>2, the method comprising the following steps for superimposing components:

fixing a lifting structure comprising lifting means, moving horizontally a second component to a position below the fixed lifting structure, lifting the second component to a predetermined height using the lifting means, positioning a first component beneath the fixed lifting structure substantially below the second component, while the second component remains substantially at said predetermined height, and placing the second component substantially on the first component using the lifting means, the method further comprising the following steps, repeated for a number p ranging from 2 to n−1, wherein a group of p components comprises the previously superimposed components of the civil engineering structure;

moving the group of p components away from the fixed lifting structure using movement means, positioning a $p+1^{th}$ component beneath the fixed lifting structure, lifting the $p+1^{th}$ component using the lifting means, positioning the group of p components beneath the fixed lifting structure substantially below the $p+1^{th}$ component, and placing the $p+1^{th}$ component substantially on the group of p components using the lifting means.

2. Method according to claim 1, in which the components are positioned beneath the fixed lifting structure using the movement means.

3. Method according to claim 1, in which the movement means comprises a jacking and horizontal movement device comprising jacks on an air cushion.

4. Method according to claim 1, in which the fixed lifting structure takes the form of a portal.

5. Method according to claim 1, in which the fixed lifting structure is located on or close to a construction surface on which the civil engineering structure is partially or wholly constructed.

6. Method according to claim 5, in which the fixed lifting structure is anchored on or close to the construction surface.

7. Method according to claim 6, in which the fixed lifting structure is anchored by means of stays.

8. Method according to claim 5, in which the construction surface is organized into working areas each having a specialized task.

9. Method according to claim 8, in which the specialized tasks comprise at least one of the following tasks: production of components, mechanical assembly and performance of functional tests on the civil engineering structure before the civil engineering structure is transported to a permanent installation site.

10. Method according to claim 9, in which the surface of the working area having the specialized task of performing tests is arranged so as to correctly distribute forces beneath the civil engineering structure.

11. Method according to claim 8, in which each specialized task is subdivided into sub-tasks, each sub-task being always carried out at the same working area and sub-components of the civil engineering structure being moved from working area to working area.

12. Method according to claim 8, in which the fixed lifting structure is also used in the context of at least one of the said specialized tasks.

13. Method according to claim 8, in which the movement means is used to move the components or sub-components of the civil engineering structure between at least one of the working areas and the fixed lifting structure.

14. Method according to claim 13, in which the movement means comprises a jacking and horizontal movement device comprising jacks on a cushion of air.

15. Method according to claim 5, in which the civil engineering structure is intended to be installed in an aquatic medium and in which the construction surface is close to an aquatic communications route.

16. Method according to claim 1, in which the civil engineering structure has a height greater than the dimensions of a base.

17. Method according to claim 16, in which the civil engineering structure is a wind generator comprising a bottom portion including a base and superimposed on said bottom portion a nacelle incorporating a hub and designed to carry the blades of a rotor.

18. Method according to claim 17, in which the nacelle is positioned beneath the fixed lifting structure, the nacelle is lifted using the lifting means, the bottom portion is positioned beneath the fixed lifting structure and substantially below the nacelle, and the nacelle is placed substantially on the bottom portion using the lifting means.

19. Method according to claim 18, in which, while being lifted and substantially placed on the bottom portion, the nacelle is fitted with only some of the blades of the rotor, the additional rotor blades being attached to the nacelle when the nacelle has been placed substantially on the bottom portion.

20. Method according to claim 19, in which the rotor comprises three blades and the nacelle is fitted with only two blades when it is lifted and substantially placed on the bottom portion.

21. Method according to claim 20, in which the nacelle and the two blades are lifted and placed substantially on the bottom portion in a position such that the third blade attached to the nacelle is placed in a vertical axis beneath the nacelle.

22. Method according to claim 18, in which the fixed lifting structure is further used to place at least a part of the blades of the rotor on the nacelle.

23. Method according to claim 18, also comprising movement of the wind generator away from the fixed lifting structure in which lateral movement of the wind generator is accompanied by rotational movement of the rotor so as to avoid contact between the blades and the fixed lifting structure.

24. Method according to claim 17, in which the civil engineering structure is an offshore gravity structure wind generator.

25. Method according to claim 16, in which the civil engineering structure is a pier of a bridge.

* * * * *